United States Patent
Zhu et al.

(10) Patent No.: US 12,304,920 B2
(45) Date of Patent: May 20, 2025

(54) PLATINUM COMPLEX, ITS PREPARATION AND THERAPEUTIC USE

(71) Applicant: CITY UNIVERSITY OF HONG KONG, Kowloon (HK)

(72) Inventors: Guangyu Zhu, Kowloon (HK); Zoufeng Xu, Kowloon (HK); Qiyuan Zhou, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 18/435,998

(22) Filed: Feb. 7, 2024

(65) Prior Publication Data

US 2024/0287114 A1    Aug. 29, 2024

Related U.S. Application Data

(62) Division of application No. 17/327,517, filed on May 21, 2021, now abandoned.

(60) Provisional application No. 63/028,646, filed on May 22, 2020.

(51) Int. Cl.
    *C07F 15/00* (2006.01)
(52) U.S. Cl.
    CPC .................. *C07F 15/0086* (2013.01)
(58) Field of Classification Search
    CPC .................. C07F 15/0093; C07F 9/28
    USPC .................. 502/162, 171; 568/8, 10
    See application file for complete search history.

(56) References Cited

PUBLICATIONS

Tan, A. et al.: Bis (carboxylato) complexes of platinum (II). J. Chem. Soc. Dalton Trans., vol. 11, pp. 2207-2214, 1996.*
Noda, H. et al.: Cyclic platina(borasiloxane)s and their chemical properties. Organometallics, vol. 37, pp. 22-29, 2018.*
Compound with RN 33071-18-0 (entered STN on Nov. 16, 1984).*

* cited by examiner

*Primary Examiner* — Charanjit Aulakh

(57) ABSTRACT

A platinum complex comprises a chemical structure of Structure (II):

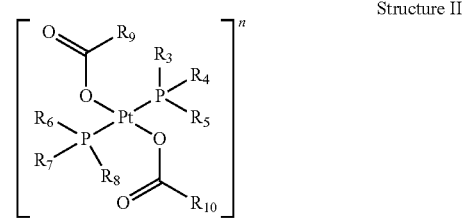

Structure II where $R_3$, $R_4$, $R_5$, $R_6$, $R_7$ and $R_8$ are independently selected From a hydrogen atom, a substituted or unsubstituted linear or branched chain C1 to C5 alkyl group, a cycloalkyl group, a substituted or unsubstituted aryl group, and a heteroaryl group, $R_9$ and $R_{10}$ are independently selected from the group consisting of a hydrogen atom, a substituted or unsubstituted linear or branched chain C1 to C5 alkyl group, a substituted or unsubstituted aryl group, and a carboxyl group; and n is an electrical charge of the complex and is 0, a positive integer or a negative integer.

3 Claims, No Drawings

PLATINUM COMPLEX, ITS PREPARATION AND THERAPEUTIC USE

CROSS-REFERENCE TO RELATED APPLICATIONS

This application claims priority to and is a divisional of U.S. patent application Ser. No. 17/327,517 filed on Nov. 8, 2023 entitled "PLATINUM COMPLEX, ITS PREPARATION AND THERAPEUTIC USE", which claims priority to U.S. Patent Provisional Application Ser. No. 63/028,646 filed on May 22, 2020, entitled "PLATINUM COMPLEX, ITS PREPARATION AND THERAPEUTIC USE"; each of which is incorporated herein by reference in their entirety for all purposes.

BACKGROUND

This invention relates to phosphine coordinated platinum complexes, particularly but not exclusively to phosphine coordinated platinum complexes which may be used for treatment of cancer, more particularly for inhibition of tumor cell growth. The invention also relates to methods of making the complexes, dosage forms including the complexes and methods of treatment using the complexes and dosage forms.

Platinum has been used as a cancer therapeutic for many years. Cisplatin defined the platinum based cancer therapeutics field when it was first discovered in 1845 and then subsequently licensed for medical use in 1978. Platinum-based anticancer drugs including cisplatin have been extensively used in the clinic to treat different types of cancer patients. Although more than 50% of cancer patients have been treated with platinum-based anticancer drugs, the drugs are facing lots of issues including toxic side effects and drug resistance.

Therefore, novel anticancer agents that are able to conquer drug resistance issues are highly desired. In certain embodiments, the phosphine-coordinated platinum complexes of the present invention aim to provide activity against cancer cell growth. In addition, certain embodiments of the present invention aim to provide efficacy in killing human cancer cells. The present invention aims to provide complexes of certain embodiments that are more efficacious as a cancer therapy than cisplatin. This is particularly true for cancer cell lines that are cisplatin-resistant.

BRIEF SUMMARY OF THE DISCLOSURE

In accordance with a first aspect of the present invention there is provided a platinum complex having a chemical structure of Structure I:

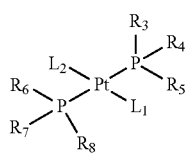

Strucure I wherein
$L_1$ and $L_2$ are independently selected from electron donor ligands, including but not limited to halogen ligands, hydroxo ligands, carboxylato ligands, and alkoxido ligands;

$R_3$, $R_4$, $R_5$, $R_6$, $R_7$ and $R_8$ are each independently selected from the group consisting of a hydrogen atom, hydrocarbon group, or heterocyclic group;

wherein the hydrocarbon group is selected from the group consisting of: alkyl, alkenyl, cycloalkyl, phenyl, and naphthyl which may optionally be substituted by at least one functional group selected from the group consisting of: hydroxy, halogen, alkoxy, alkoxycarbonyl, carboxy, amido, amino, nitro, cyano, carbamate, urea, sulfonyl, sulfenyl, phosphenyl, phosphinyl, sulfide, thioether, thioester, sugar moiety, cyclodextrin, and porphyrin ring; and the heterocyclic group is selected from the group consisting of: pyridyl, piperidyl, azino, azolyl, imidazolyl, triazinyl, furyl and carbozolyl; or two adjacent $R_3$, $R_4$, $R_5$, $R_6$, $R_7$ and $R_8$ groups form a heterocycle or a carbocycle with or without an intermediary hetero atom or intermediary hetero atoms.

In embodiments the platinum complex has a structure of Structure II:

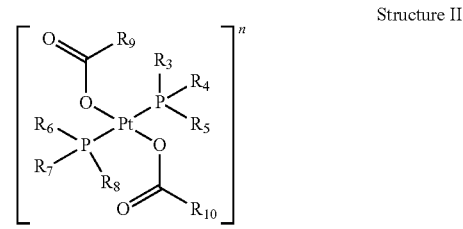

Structure II wherein
$R_3$, $R_4$, $R_5$, $R_6$, $R_7$ and $R_8$ are independently selected from a hydrogen atom, a substituted or unsubstituted linear or branched chain C1 to C5 alkyl group, a cycloalkyl group, a substituted or unsubstituted aryl group, or a heteroaryl group, optionally $R_3$ is identical to $R_6$, $R_4$ is identical to $R_7$, and $R_5$ is identical to $R_8$;

$R_9$ and $R_{10}$ are independently selected from a hydrogen atom, a substituted or unsubstituted linear or branched chain C1 to C5 alkyl group, a substituted or unsubstituted aryl group, or a carboxyl group; and n is an electrical charge of the complex and is selected from zero, any positive integer or negative integer (optionally n is 0, or 2+).

As stated above, n is an electrical charge of the complex. As the skilled person would appreciate, the complex may consequently have a counter ion to provide a balancing electrical charge. In embodiments, the complex optionally further comprises a counter ion selected from: anions, including but not limited to nitrogen (N)-containing anions, oxygen (O)-containing anions, phosphorous (P)-containing anions, sulfur (S)-containing anions, and halogen containing anions. Preferably, the counter ion is a halide counter ion, such as chloride.

When substituted a group may be substituted with a halo group, —$NH_2$, an amine substituted with one or two C1-C5 alkyl, a linear or branched chain C1 to C5 alkyl group, a C1 to C5 alkoxy group, a C1 to C5 acyl group or a C1 to C5 carboxyl group.

In embodiments $R_3$, $R_4$, $R_6$, and $R_7$ are independently selected from: a substituted or unsubstituted aryl group, or a heteroaryl group. In embodiments $R_3$, $R_4$, $R_6$, and $R_7$ are independently selected from: an unsubstituted aryl group; an aryl group substituted with a halo group, a linear or branched chain C1 to C5 alkyl group, or a C1 to C5 alkoxy group; and a heteroaryl group.

In embodiments $R_3$, $R_4$, $R_6$, and $R_7$ are independently selected from: phenyl, tolyl, chlorophenyl, methoxyphenyl, and fluorophenyl.

In embodiments $R_3$, $R_4$, $R_6$ and $R_7$ are selected from any one of the following groups: a phenyl group,

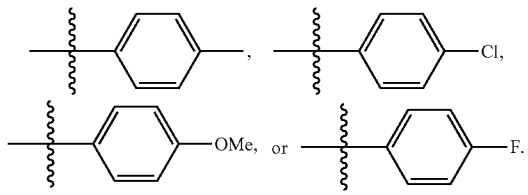

Optionally, $R_3$, $R_4$, $R_6$ and $R_7$ are identical.

In embodiments $R_5$ and $R_8$ are independently selected from: an unsubstituted linear or branched chain C1 to C5 alkyl group, a cycloalkyl group (optionally a C4 to C8 cycloalkyl group), a substituted or unsubstituted aryl group, or a heteroaryl group.

In embodiments $R_5$ and $R_8$ are independently selected from: a C4 to C8 cycloalkyl group, an unsubstituted aryl group, a heteroaryl group, and an aryl group substituted with a halo group, —$NH_2$, an amine substituted with one or two C1 to C5 alkyl groups, a linear or branched chain C1 to C5 alkyl group, or a C1 to C5 alkoxy group.

In embodiments $R_5$ and $R_8$ are independently selected from: ethyl, cyclohexyl, pyridyl, tolyl, chlorophenyl, fluorophenyl, N,N-dimethylaminophenyl, methoxy phenyl.

In embodiments $R_5$ and $R_8$ are selected from any one of the following groups:
an ethyl group,

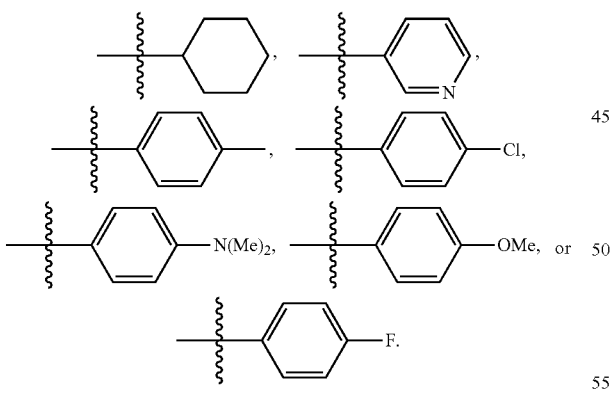

Optionally, $R_5$ and $R_8$ are identical

In embodiments $R_9$ and $R_{10}$ are independently selected from: a linear chain C1 to C5 alkyl group; a C1 to C5 carboxyl group; an unsubstituted aryl group (preferably a C6 to C10 aryl group); and an aryl group (preferably a C6 to C10 aryl group) substituted with a branched or linear chain C1 to C5 alkyl group, a C1 to C5 acyl group; a C1 to C5 carboxyl group (optionally—$C(O)_2H$).

In embodiments $R_9$ and $R_{10}$ are independently selected from: methyl, phenyl, carboxypropyl, and carboxyphenyl.

In embodiments $R_9$ and $R_{10}$ are independently selected from any one of the following groups:
a methyl group,

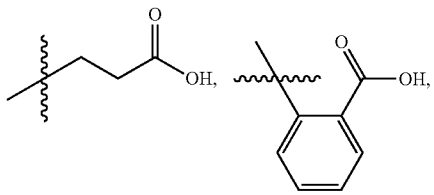 [SMILES: *CCC(=O)O ; *c1ccccc1C(=O)O]

or a phenyl group.

In embodiments the platinum complex is a platinum complex, wherein:
$R_1$, and $R_2$ are independently selected from any one of the following groups:
a methyl group,

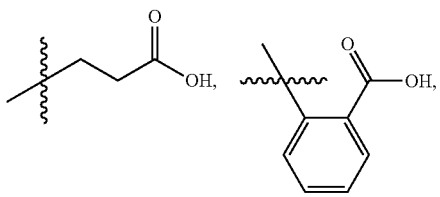 [SMILES: *CCC(=O)O ; *c1ccccc1C(=O)O]

or a phenyl group;

$R_3$, $R_4$, $R_6$ and $R_7$ are identical, and they are selected from any one of the following groups:
a phenyl group,

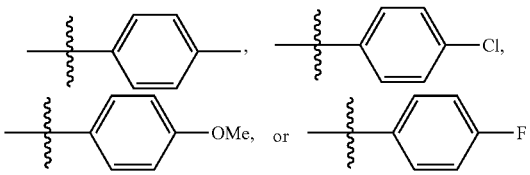

$R_5$ and $R_8$ are identical and are selected from any one of the following groups:
an ethyl group,

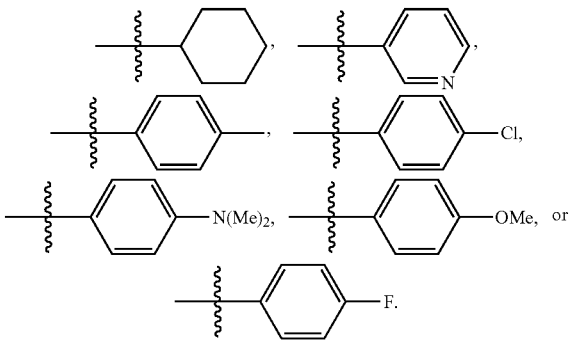

In embodiments the platinum complex is a complex having the structure of Structure II wherein:
$R_3$, $R_4$, $R_5$, $R_6$, $R_7$ and $R_8$ are phenyl and $R_9$ and $R_{10}$ are methyl;

$R_3$, $R_4$, $R_5$, $R_6$, $R_7$ and $R_8$ are phenyl and $R_9$ and $R_{10}$ are;

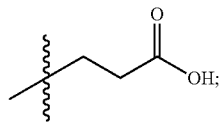

$R_3$, $R_4$, $R_5$, $R_6$, $R_7$ and $R_8$ are phenyl and $R_9$ and $R_{10}$ are;

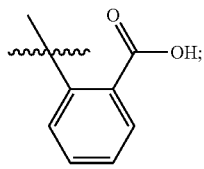 [SMILES: *c1ccccc1C(=O)O]

$R_3$, $R_4$, $R_5$, $R_6$, $R_7$ and $R_8$ are phenyl; $R_9$ is methyl, and $R_{10}$ are phenyl; and $R_3$, $R_4$, $R_5$, $R_6$, $R_7$ and $R_8$ are phenyl; $R_9$ is phenyl, and $R_{10}$ is

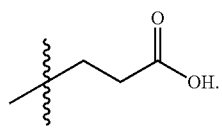 [SMILES: *CCC(=O)O]

In embodiments the platinum complex is a complex having the structure of Structure III:

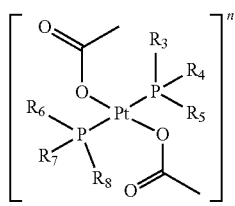

Srtucture III

In embodiments the platinum complex is a complex having the structure of Structure III wherein:

$R_3$, $R_4$, $R_6$ and $R_7$ are phenyl and $R_5$ and $R_8$ are;

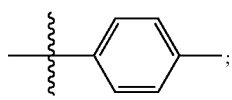

$R_3$, $R_4$, $R_5$, $R_6$, $R_7$ and $R_8$ are;

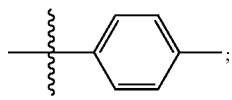

$R_3$, $R_4$, $R_5$, $R_6$, $R_7$ and $R_8$ are;

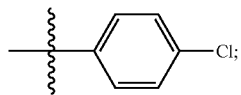 [SMILES: *c1ccc(Cl)cc1]

$R_3$, $R_4$, $R_6$ and $R_7$ are phenyl and $R_5$ and $R_8$ are

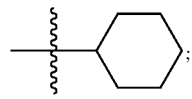

$R_3$, $R_4$, $R_6$ and $R_7$ are phenyl and $R_5$ and $R_8$ are

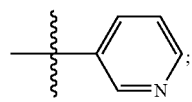

In embodiments the platinum complex is a complex having the structure of Structure IV:

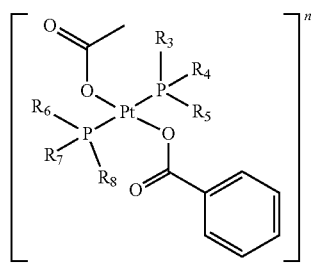

Structure IV

In embodiments where the metal complex has any structure disclosed herein, $PR_6R_7R_8$ and $PR_3R_4R_5$ are represented by the following phosphine ligands:

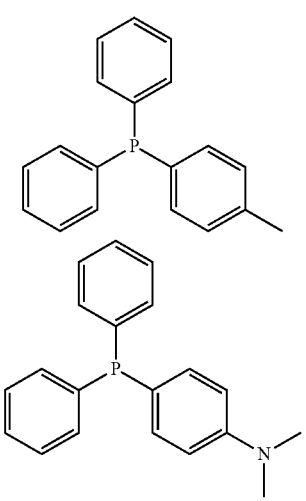

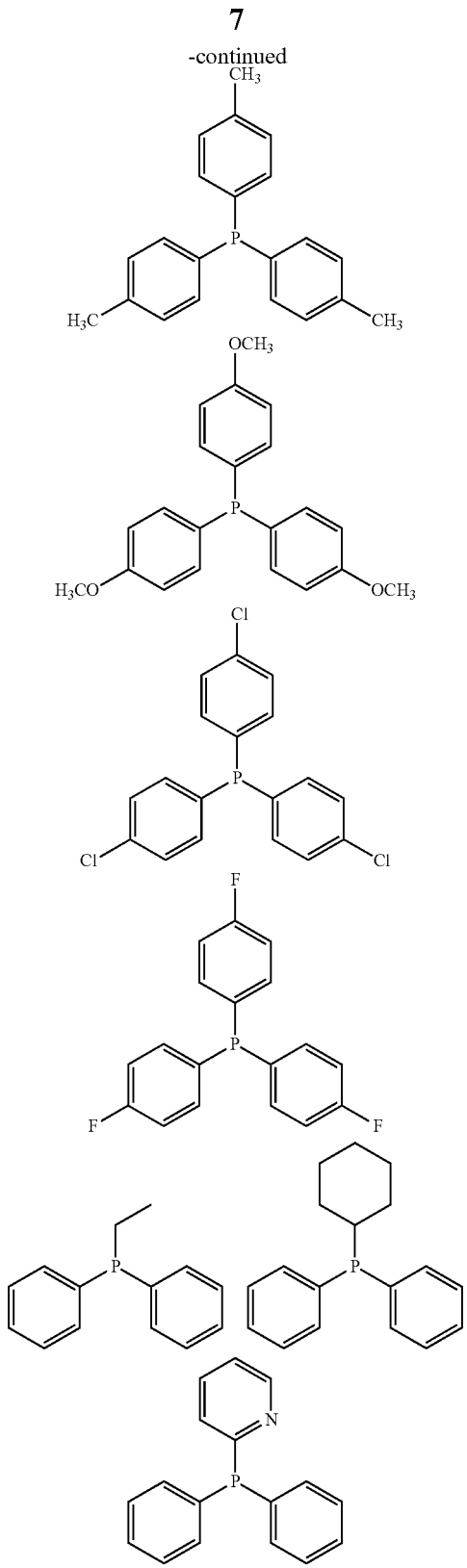

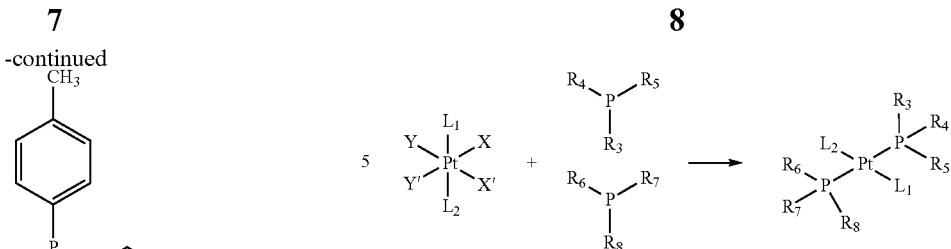

wherein:
X, X, Y, and Y' are selected from electron donor ligands, including but not limited to nitrogen (N)-containing ligands, oxygen (O)-containing ligands, phosphorous (P) containing ligands, sulfur (S)-containing ligands, and halogen containing ligands;

$L_1$ and $L_2$ are independently selected from electron donor ligands, including but not limited to halogen ligands, hydroxo ligands, carboxylato ligands and alkoxido ligands;

$R_3$, $R_4$, $R_5$, $R_6$, $R_7$ and $R_8$ are each independently selected from the group consisting of a hydrogen atom, hydrocarbon group, or heterocyclic group; hydrocarbon group including but not limited to alkyl, alkenyl, cycloalkyl, phenyl, and naphthyl which may optionally be substituted by at least one functional group selected from the group consisting of hydroxy, halogen, alkoxy, alkoxycarbonyl, carboxy, amido, amino, nitro, cyano, carbamate, urea, sulfonyl, sulfenyl, phosphenyl, phosphinyl, sulfide, thioether, thioester, sugar moiety, cyclodextrin, and porphyrin ring; heterocyclic group is selected from the group consisting of pyridyl, piperidyl, azino, azolyl, imidazolyl, triazinyl, furyl and carbozolyl; or adjacent $R_1$, $R_2$, and $R_3$ may form a heterocycle or a carbocycle with or without an intermediary hetero atom or intermediary hetero atoms.

According to a further aspect of the present invention there is provided a platinum complex of Structure V:

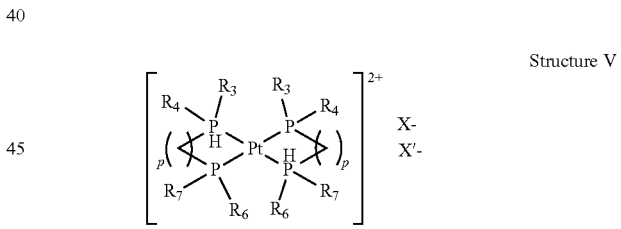

Structure V wherein
p is the number of methylene groups, which may be 1, 2, 3, or 4;

X- and X'-are selected from anions, including but not limited to nitrogen (N)-containing anions, oxygen (O)-containing anions, phosphorous (P)-containing anions, sulfur (S)-containing anions, and halogen containing anions;

$R_3$, $R_4$, $R_6$ and $R_7$ are each independently selected from the group consisting of a hydrogen atom, hydrocarbon group, or heterocyclic group; hydrocarbon group including but not limited to alkyl, alkenyl, cycloalkyl, phenyl, and naphthyl which may optionally be substituted by at least one functional group selected from the group consisting of hydroxy, halogen, alkoxy, alkoxycarbonyl, carboxy, amido, amino, nitro, cyano, carbamate, urea, sulfonyl, sulfenyl, phosphenyl, phosphinyl, sulfide, thioether, thioester, sugar moiety, cyclodextrin, According to a further aspect of the present invention there is provided a process for preparing a compound of the present invention by the reaction of [PtXX'YY'$L_1L_2$] and the corresponding phosphine ligands (PR$_3$R$_4$R$_5$ or PR$_6$R$_7$R$_8$), wherein $R_3$ is identical to $R_6$, $R_4$ is identical to $R_7$, and $R_5$ is identical to $R_8$:

and porphyrin ring; heterocyclic group is selected from the group consisting of pyridyl, piperidyl, azino, azolyl, imidazolyl, triazinyl, furyl and carbozolyl; or adjacent $R_3$, $R_4$, $R_6$ and $R_7$ may form a heterocycle or a carbocycle with or without an intermediary hetero atom or intermediary hetero atoms.

In embodiments $R_3$, $R_4$, $R_6$ and $R_7$ have any definition set out herein.

Preferably, $R_3$, $R_4$, $R_6$ and $R_7$ are phenyl. Preferably, X- and X'-are halogen containing anions such as chloride.

In embodiments the platinum complex may have a structure selected from Structure VIa and VIb:

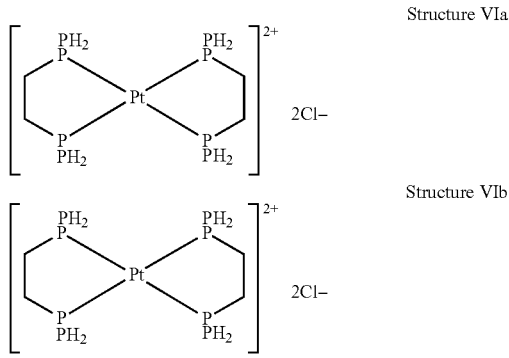

According to an aspect of the present invention there is provide a process for preparing a compound of the present invention by a reaction of [PtXX'YY'$L_1L_2$] and the corresponding chelating phosphine ligands:

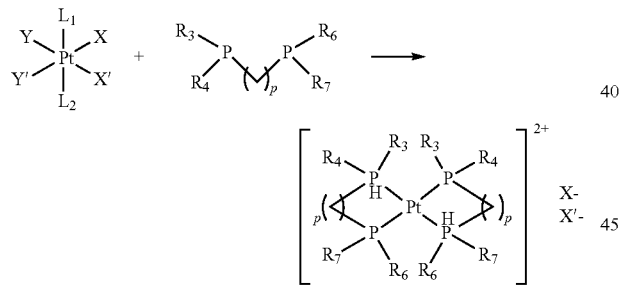

wherein
n is the number of methylene groups, which may be 1, 2, 3, or 4;

X- and X'-are selected from anions, including but not limited to nitrogen (N)-containing anions, oxygen (O)-containing anions, phosphorous (P)-containing anions, sulfur (S)-containing anions, and halogen containing anions;

Y, and Y' are selected from electron donor ligands, including but not limited to nitrogen (N)-containing ligands, oxygen (O)-containing ligands, phosphorous (P)-containing ligands, sulfur (S)-containing ligands, and halogen containing ligands;

$L_1$ and $L_2$ are independently selected from electron donor ligands, including but not limited to halogen ligands, hydroxo ligands, carboxylato ligands and alkoxido ligands;

$R_3$, $R_4$, $R_6$ and $R_7$ each independently selected from the group consisting of a hydrogen atom, hydrocarbon group, or heterocyclic group; hydrocarbon group including but not limited to alkyl, alkenyl, cycloalkyl, phenyl, and naphthyl which may optionally be substituted by at least one functional group selected from the group consisting of hydroxy, halogen, alkoxy, alkoxycarbonyl, carboxy, amide, amino, nitre, cyano, carbamate, urea, sulfonyl, sulfenyl, phosphenyl, phosphinyl, sulfide, thioether, thioester, sugar moiety, cyclodextrin, and porphyrin ring; heterocyclic group is selected from the group consisting of pyridyl, piperidyl, azino, azolyl, imidazolyl, triazinyl, furyl and carbozolyl; or adjacent $R_3$, $R_4$, $R_6$ and $R_7$ may form a heterocycle or a carbocycle with or without an intermediary hetero atom or intermediary hetero atoms.

In a further aspect of the present invention, there is provided a method of treating a subject suffering from a cancer comprising administering an effective amount of the platinum complex of the present invention to a subject.

In a further aspect, there is provided a metal complex of the present invention for use in a method of treating cancer.

In another aspect the present invention there is provided a pharmaceutical dosage form comprising a complex in accordance with this invention and one of more excipients.

In embodiments of the method and the metal complex for use, the cancer is selected from an ovarian cancer, a lung cancer, or a breast cancer.

In particular the cancer may be a cisplatin resistant cancer cell line. For example, a cisplatin resistant ovarian cancer, a cisplatin resistant lung cancer, or a cisplatin resistant breast cancer.

In embodiments of the method and the metal complex for use, the cancer is selected from the following cancer cell lines: A2780, A2780CisR, A549 and A549CisR and MCF-7.

DETAILED DESCRIPTION

A platinum complex comprising a structure of Formula (I):

$L_1$, $L_1'$, $L_2$, and $L_2'$ are independently selected from a nitrogen-containing ligand, an oxygen containing ligand, a phosphorous-containing ligand, a sulfur-containing ligand or a halogen containing ligand, optionally $L_1$, and $L_1'$, are linked to form a first bidentate ligand, and $L_2$, and $L_2'$ are linked to form a second bidentate ligand; and n is selected from zero, any positive integer or negative integer.

In embodiments $L_1$, $L_1'$, $L_2$, and $L_2'$ are independently selected from hydroxido, halido, carboxylato, alkoxido, or substituted or unsubstituted phosphine ligand.

In embodiments $L_1$, $L_1'$, $L_2$, and $L_2'$ are identical.

In embodiments the platinum complex has a structure of Formula (IIa):

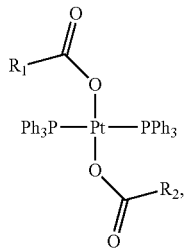

Formula (IIa)

wherein $R_1$ and $R_2$ are independently selected from any one of the following groups:

a methyl group,

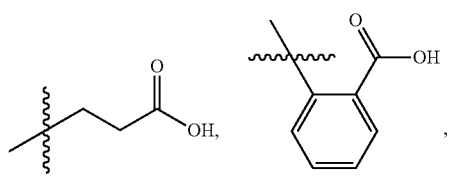 [SMILES: *CCC(=O)O ; *c1ccccc1C(=O)O]

, or a phenyl group.

In embodiments the platinum complex has a structure of Formula (IIb):

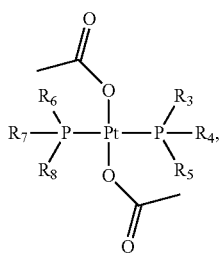

Formula (IIb)

and wherein $R_3$, $R_4$, $R_6$ and $R_7$ are identical, and they are selected from any one of the following groups:

a phenyl group,

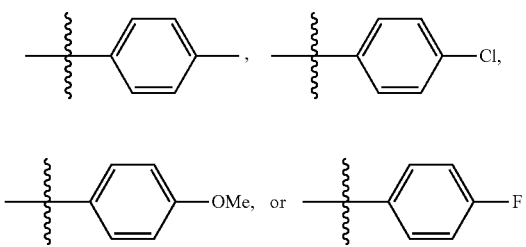

$R_5$, and $R_8$ are identical and are selected from any one of the following groups:

an ethyl group,

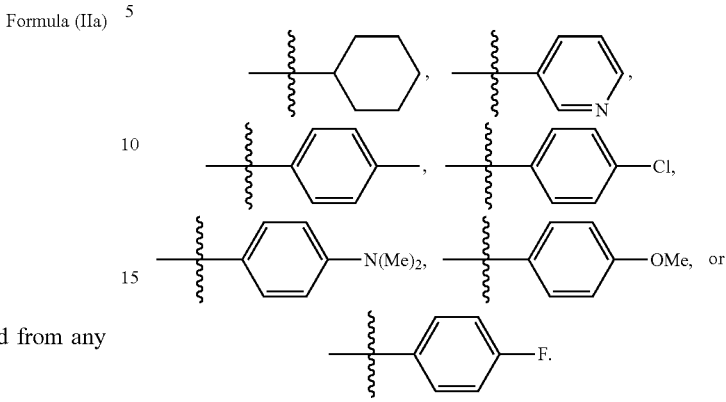

In embodiments the platinum complex has a structure of Formula (III)

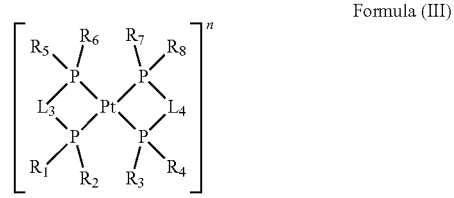

Formula (III)

$R_1$, $R_2$, $R_3$, $R_4$, $R_5$, $R_6$, $R_7$ and $R_8$ are independently selected from a hydrogen atom, a substituted or unsubstituted linear or branched chain C1 to C5 alkyl group, a substituted or unsubstituted aryl group, or a heteroaryl group;

$L_3$ and $L_4$, are independently a linker group of $-(CH_2)_m-$ with m being 1, 2, 3 or 4, preferably $L_3$ and $L_4$, are identical; and n is selected from zero, any positive integer or negative integer.

In an aspect of the present invention, there is provided a method of treating a subject suffering from a cancer comprising administering an effective amount of the platinum complex of the present invention to a subject.

The present invention also relates to a platinum complex for use in the method of treatment.

In embodiments, the cancer is selected from an ovarian cancer, a lung cancer, or a breast cancer.

In embodiments, the platinum complex for use in the method of treatment is a platinum complex comprising a chemical structure of Structure I:

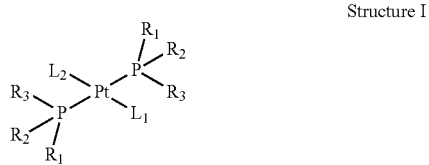

Structure I wherein

L$_1$ and L$_2$ are independently selected from electron donor ligands, including but not limited to halogen ligands, hydroxo ligands, carboxylato ligands, and alkoxido ligands;

R$_1$, R$_2$ and R$_3$ are each independently selected from the group consisting of a hydrogen atom, hydrocarbon group, or heterocyclic group;

wherein the hydrocarbon group is selected from: alkyl, alkenyl, cycloalkyl, phenyl, and naphthyl which may optionally be substituted by at least one functional group selected from the group consisting of: hydroxy, halogen, alkoxy, alkoxycarbonyl, carboxy, amido, amino, nitro, cyano, carbamate, urea, sulfonyl, sulfenyl, phosphenyl, phosphinyl, sulfide, thioether, thioester, sugar moiety, cyclodextrin, and porphyrin ring; and the heterocyclic group is selected from the group consisting of: pyridyl, piperidyl, azino, azolyl, imidazolyl, triazinyl, furyl and carbozolyl;

or two adjacent R$_1$, R$_2$ and R$_3$ groups form a heterocycle or a carbocycle with or without an intermediary hetero atom or intermediary hetero atoms.

In embodiments, the platinum complex for use in the method of treatment is the platinum complex having a structure of Structure (II):

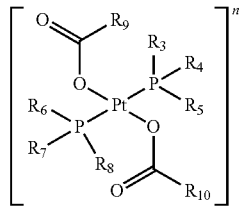

Structure II wherein

R$_3$, R$_4$, R$_5$, R$_6$, R$_7$ and R$_8$ are independently selected from a hydrogen atom, a substituted or unsubstituted linear or branched chain C1 to C5 alkyl group, a cycloalkyl group, a substituted or unsubstituted aryl group, or a heteroaryl group, optionally R$_3$ is identical to R$_6$, R$_4$ is identical to R$_7$, and R$_5$ is identical to R$_8$;

R$_9$ and R$_{10}$ are independently selected from a hydrogen atom, a substituted or unsubstituted linear or branched chain C1 to C5 alkyl group, a substituted or unsubstituted aryl group, or a carboxyl group; and n is selected from zero, any positive integer or negative integer (optionally n is 0, or 2+).

In embodiments, the platinum complex for use in the method of treatment is a platinum complexes of Structure V:

Structure V

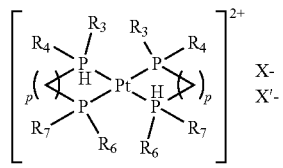

wherein p is the number of methylene groups, which may be 1, 2, 3, or 4;

X- and X'-are selected from anions, including but not limited to nitrogen (N)-containing anions, oxygen (O)-containing anions, phosphorous (P)-containing anions, sulfur (S)-containing anions, and halogen containing anions;

R$_3$, R$_4$, R$_6$ and R$_7$ are each independently selected from the group consisting of a hydrogen atom, hydrocarbon group, or heterocyclic group; hydrocarbon group including but not limited to alkyl, alkenyl, cycloalkyl, phenyl, and naphthyl which may optionally be substituted by at least one functional group selected from the group consisting of hydroxy, halogen, alkoxy, alkoxycarbonyl, carboxy, amido, amino, nitro, cyano, carbamate, urea, sulfonyl, sulfenyl, phosphenyl, phosphinyl, sulfide, thioether, thioester, sugar moiety, cyclodextrin, and porphyrin ring; heterocyclic group is selected from the group consisting of pyridyl, piperidyl, azino, azolyl, imidazolyl, triazinyl, furyl and carbozolyl; or adjacent R$_3$, R$_4$, R$_6$ and R$_7$ may form a heterocycle or a carbocycle with or without an intermediary hetero atom or intermediary hetero atoms.

In embodiments, the platinum complex for use in the method of treatment is a complex having a structure of Structure VIa or VIb:

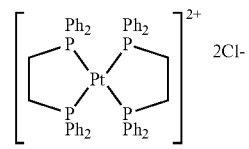

Structure VIa

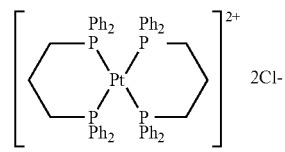

Structure VIb

EXAMPLES

1. Materials

All reactions were carried out under in the dark. All the reagents and solvents were used as received without further purification 2. General Measurements NMR spectra were collected on a Bruker Ascend AVANCE Ill 600 MHz spectrometer or a Bruker AVANCE Ill 400 MHz spectrometer. Chemical shifts are reported in parts per million compared with residual solvent peaks. ESI-MS was performed on an Agilent API-2000 Triple-Q MS/MS spectrometer. High-resolution ESI-MS data were obtained on Thermo Scientific LTQ Qrbitrap XL mass spectrometer. Elemental analysis was performed using a Vario Micro elemental analyzer.

3. Synthesis and characterizations
3.1 Synthesis of t-[Pt($R_1$COO)($R_2$COO)(PPh$_3$)$_2$]

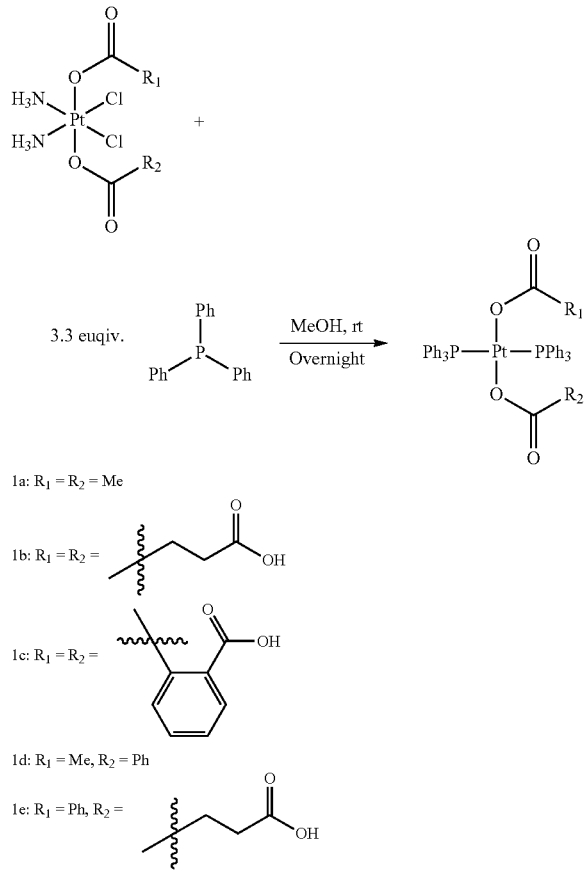

Scheme 1. Synthesis route of t-[Pt($R_1$COO)($R_2$COO)(PPh$_3$)$_2$]

Triphenylphosphine (PPh$_3$, 3.3 equiv., 0.56 mmol, 147 mg), together with carbozolyl (IV) complexes {0.17 mmol, which is 71 mg of c,c,t-[Pt(NH$_3$)$_2$Cl$_2$(acetato)$_2$], 91 mg of c,c,t-[Pt(NH$_3$)$_2$Cl$_2$(succinato)$_2$], 107 mg of c,c,t-[Pt(NH$_3$)$_2$Cl$_2$(phthalato)$_2$], 82 mg of c,c,t-[Pt(NH$_3$)$_2$Cl$_2$(acetate)(benzoato)], or 92 mg of c,c,t-[Pt(NH$_3$)$_2$Cl$_2$(acetate)(benzoato)]} was dissolved in MeOH (5 mL). The reaction mixture was then stirred at room temperature overnight, after which the solvent was removed by rotary evaporation, and the crude product was collected and purified by column chromatography (silica gel, 10:1 DCM:MeOH). The product was obtained as an off white solid.

t-[Pt(acetato)$_2$(PPh$_3$)$_2$] (1a). Yield: 67%, 95 mg (0.11 mmol). Anal Calcd for: C$_{40}$H$_{36}$O$_4$P$_2$Pt (837.76): C, 57.35; H, 4.33; N, 0.00. Found: C, 57.43; H, 4.30; N, 0.04. $^1$H NMR (600 MHz, Chloroform-d) δ 7.76 (q, J=5.8 Hz, 12H), 7.42 (t, J=7.2 Hz, 6H), 7.38 (t, J=7.3 Hz, 12H), 0.88 (s, 6H). $^{13}$C NMR (151 MHz, Chloroform-d) δ 176.0, 134.8 (t, $J_{P-C}$=6.4 Hz), 130.4, 129.2 (t, $J_{P-C}$=27.7 Hz), 128.1 (t, J=5.3 Hz), 21.1. $^{31}$P NMR (243 MHz, Chloroform-d) δ 14.2 (s+d, $J_{Pt-P}$=3069.1 Hz). $^{195}$Pt NMR (129 MHz, Chloroform-d) δ-2896.3 (t, $J_{P-Pt}$=3080.1 Hz). ESI-MS (positive ion mode): δ37.9 m/z [M+H]$^+$; calcd for C$_{40}$H$_{37}$O$_4$P$_2$Pt m/z 838.2 [M+H]$^+$.

t-[Pt(succinato)$_2$(PPh$_3$)$_2$] (1b). Yield: 71%, 115 mg (0.12 mmol). Anal Calcd for: C$_{44}$H$_{40}$O$_8$P$_2$Pt (953.83): C, 55.41; H, 4.23; N, 0.00. Found: C, 55.24; H, 4.15; N, 0.05. $^1$H NMR (600 MHz, Chloroform-d) δ 12.89 (s, 2H), 7.66 (q, J=6.2 Hz, 12H), 7.50 (t, J=7.4 Hz, 6H), 7.43 (t, J=7.5 Hz, 12H), 1.53-1.51 (m, 4H), 1.49-1.44 (m, 4H). $^{13}$C NMR (151 MHz, Chloroform-d) δ 181.1, 173.6, 134.5 (t, $J_{P-C}$=6.4 Hz), 131.2, 128.6 (t, $J_{P-C}$=5.4 Hz), 127.9 (t, $J_{P-C}$=28.1 Hz), 31.4, 29.7. $^{31}$P NMR (243 MHz, Chloroform-d) δ 14.5 (s+d, $J_{Pt-P}$=2928.2 Hz). $^{195}$Pt NMR (129 MHz, Chloroform-d) δ-2911.5 (t, $J_{P-Pt}$=3025.1 Hz). ESI-MS (positive ion mode): 953.9 m/z [M+H]$^+$; calcd for C$_{44}$H$_{41}$O$_8$P$_2$Pt m/z 954.2 [M+H]$^+$.

t-[Pt(phthalato)$_2$(PPh$_3$)$_2$] (1c). Yield: 66%, 118 mg (0.11 mmol). Anal Calcd for: C$_{52}$H$_{40}$O$_8$P$_2$Pt (1049.92): C, 59.49; H, 3.84; N, 0.00. Found: C, 59.10; H, 3.90; N, 0.07. $^1$H NMR (600 MHz, Chloroform-d) δ 16.02 (s, 2H), 8.08 (d, J=7.6 Hz, 2H), 7.73 (q, J=5.9 Hz, 12H), 7.35 (t, J=7.4 Hz, 6H), 7.33-7.31 (m, 2H), 7.29 (t, J=7.3 Hz, 12H), 7.11-7.07 (m, 4H). $^{13}$C NMR (151 MHz, Chloroform-d) δ 174.7, 166.8, 134.4 (t, $J_{P-C}$=6.5 Hz), 133.3, 132.4, 131.7, 131.3, 131.2, 130.5, 130.4, 128.7 (t, $J_{P-C}$=5.4 Hz), 127.2 (t, $J_{P-C}$=28.4 Hz). $^{31}$P NMR (243 MHz, Chloroform-d) δ 15.5 (s+d, $J_{Pt-P}$=2896.6 Hz). $^{195}$Pt NMR (129 MHz, Chloroform-d) δ-2924.3 (t, $J_{P-Pt}$=2903.1 Hz). ESI-MS (positive ion mode): 1049.9 m/z [M+H]$^+$; calcd for C$_{52}$H$_{41}$O$_8$P$_2$Pt m/z 1050.2 [M+H]$^+$.

t-[Pt(acetato)(benzoato)(PPh$_3$)$_2$] (1d). Yield: 74%, 113 mg (0.13 mmol). Anal Calcd for: C$_{45}$H$_{38}$O$_4$P$_2$Pt (899.83): C, 60.07; H, 4.26; N, 0.00. Found: C, 59.89; H, 4.32; N, 0.06. H NMR (600 MHz, Chloroform-d) δ 7.77 (q, J=5.7 Hz, 12H), 7.36-7.29 (m, 18H), 7.11 (t, J=7.3 Hz, 1H), 7.06 (d, J=7.0 Hz, 2H), 6.94 (t, J=7.7 Hz, 2H), 0.88 (s, 3H). $^{13}$C NMR (151 MHz, Chloroform-d) δ 176.0, 171.0, 134.8 (t, $J_{P-C}$=6.5 Hz), 130.3, 129.5, 129.2, 129.0, 128.8, 128.1 (t, $J_{P-C}$=5.3 Hz), 126.4, 21.0. $^{31}$P NMR (243 MHz, Chloroform-d) δ 14.8 (s+d, $J_{Pt-P}$=3110.4 Hz). $^{195}$Pt NMR (129 MHz, Chloroform-d) δ-2909.7 (t, $J_{P-Pt}$=3114.1 Hz). ESI-MS (positive ion mode): 899.9 m/z [M+H]$^+$; calcd for C$_{45}$H$_{39}$O$_4$P$_2$Pt m/z 900.2 [M+H]$^+$.

t-[Pt(succinato)(benzoato)(PPh$_3$)$_2$] (1e). Yield: 69%, 112 mg (0.12 mmol). Anal Calcd for: C$_{47}$H$_{40}$O$_6$P$_2$Pt (957.86): C, 58.94; H, 4.21; N, 0.00. Found: C, 59.32; H, 4.27; N, 0.04. $^1$H NMR (600 MHz, Chloroform-d) δ 13.36 (s, 1H), 7.73 (q, J=5.8 Hz, 12H), 7.38 (t, J=7.3 Hz, 6H), 7.33 (t, J=7.3 Hz, 12H), 7.13 (t, J=7.3 Hz, 1H), 7.09 (d, J=7.0 Hz, 2H), 6.96 (t, J=7.7 Hz, 2H), 1.48 (s, 4H). $^{13}$C NMR (151 MHz, Chloroform-d) δ 181.2, 173.8, 171.2, 134.6, 130.8, 129.8, 128.9, 128.5, 128.4, 128.1, 31.6, 29.7. $^{31}$P NMR (243 MHz, Chloroform-d) δ 14.8 (s+d, $J_{Pt-P}$=2986.5 Hz). $^{195}$Pt NMR (129 MHz, Chloroform-d) δ-2914.5 (t, $J_{P-Pt}$=3014.1 Hz). ESI-MS (positive ion mode): 958.0 m/z [M+H]$^+$; calcd for C$_{47}$H$_{41}$O$_6$P$_2$Pt m/z 958.2 [M+H]$^+$.

3.2 Synthesis of t-[Pt(acetato)$_2$(PR$_3$)$_2$]

Scheme 2. Synthesis route of t-[Pt(acetato)$_2$(PR$_3$)$_2$]

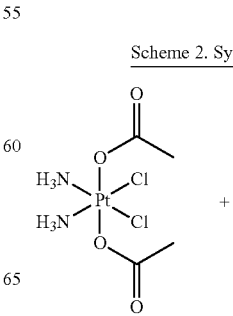

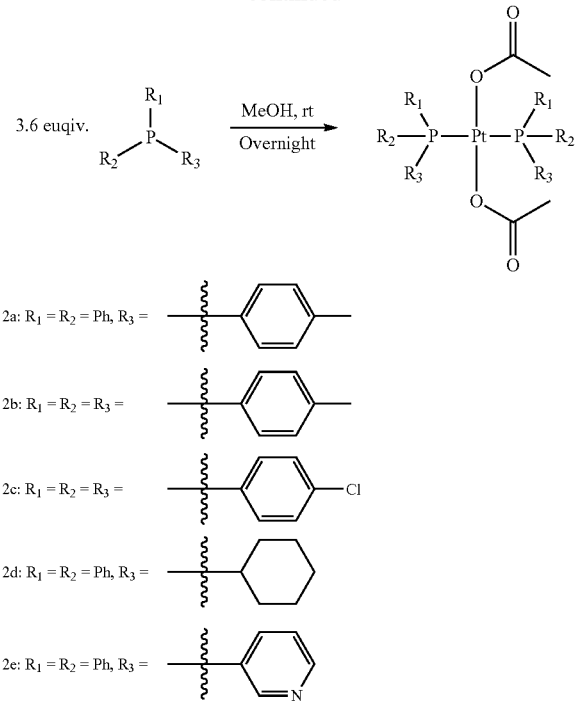

c,c,t-[Pt(NH$_3$)$_2$Cl$_2$(acetato)$_2$] (71 mg, 0.17 mmol) was suspended in methanol (3 mL), to which 3.6 equiv. of phosphines [0.61 mmol, diphenyl(p-tolyl)phosphine (169 mg), tri(p-tolyl)phosphine (186 mg), tris(4-chlorophenyl)phosphine (224 mg), cyclohexyldiphenylphosphine (164 mg) or diphenyl-2-pyridylphosphine (161 mg)] were added. The mixture was stirred overnight at room temperature. The desired product was isolated and purified by aluminum oxide column chromatography, using dichloromethane/methanol (10:1) as an eluent. After evaporation, the final product was washed with diethyl ether (30 mL) twice and collected as a white solid by centrifugation.

t-[Pt(acetato)$_2$(C$_9$H$_{17}$P)$_2$] (2a). Yield: 63% (91 mg, 0.105 mmol). HRMS (ESI) m/z calculated for C$_{42}$H$_{41}$P$_2$O$_4$Pt$^+$ (M+H)$^+$866.21223, found 866.21216. $^1$H NMR (600 MHz, Chloroform-d) δ 7.73 (q, J=5.8 Hz, 8H), 7.69-7.64 (m, 4H), 7.39 (m, 12H), 7.20 (d, J=7.7 Hz, 4H), 2.36 (s, 6H), 0.89 (s, 6H). $^{13}$C NMR (151 MHz, Chloroform-d) δ 175.9, 140.7, 134.9 (t, J=6.6 Hz), 134.7 (t, J=6.4 Hz), 130.2, 129.5 (t, J=27.7 Hz), 128.9 (t, J=5.5 Hz), 128.0 (t, J=5.3 Hz), 125.7 (t, J=28.5 Hz), 21.5, 21.2. $^{31}$P NMR (243 MHz, Chloroform-d) δ 13.7 (s+d, J=3187.8 Hz). $^{195}$Pt NMR (129 MHz, Chloroform-d) δ-2898.1 (t, J=3077.94 Hz).

t-[Pt(acetato)$_2$(C$_{21}$H$_{21}$P)$_2$] (2b). Yield: 77% (85 mg, 0.092 mmol). HRMS (ESI) m/z calculated for C$_{46}$H$_{49}$O$_4$P$_2$Pt$^+$ (M+H)$^+$922.27483, found 922.27423. $^1$H NMR (600 MHz, Chloroform-d) δ 7.62 (d, J=6.4 Hz, 12H), 7.17 (d, J=7.4 Hz, 12H), 2.34 (s, 18H), 0.91 (s, 6H). $^{13}$C NMR (151 MHz, Chloroform-d) δ 175.8, 140.3, 134.7 (t, J=6.5 Hz), 128.8 (t, J=5.5 Hz), 126.2 (t, J=28.6 Hz), 21.4, 21.3. $^{31}$P NMR (243 MHz, Chloroform-d) δ 12.7 (s+d, J=3061.8 Hz). $^{195}$Pt NMR (129 MHz, Chloroform-d) δ-2898.5 (t, J=3045.7 Hz).

t-[Pt(acetato)$_2$(C$_{18}$H$_{12}$Cl$_3$P)$_2$] (2c). Yield: 64% (112 mg, 0.107 mmol). HRMS (ESI) m/z calculated for C$_{40}$H$_{31}$O$_4$P$_2$Cl$_6$Pt$^+$ (M+H)$^+$1041.94710, found 1041.94666. $^1$H NMR (600 MHz, Chloroform-d) δ 7.62 (m, 12H), 7.40 (d, J=8.4 Hz, 12H), 0.97 (s, 6H). $^{13}$C NMR (151 MHz, Chloroform-d) δ 176.2, 137.8, 135.8 (t, J=7.0 Hz), 128.8 (t, J=5.6 Hz), 126.5 (t, J=28.5 Hz), 21.2. $^{31}$P NMR (243 MHz, Chloroform-d) δ 12.7 (s+d, J=3134.7 Hz). $^{195}$Pt NMR (129 MHz, Chloroform-d) δ-2914.0 (t, J=3134.7 Hz).

t-[Pt(acetato)$_2$(C$_{18}$H$_{21}$P)$_2$] (2d). Yield: 51% (105 mg, 0.123 mmol). HRMS (ESI) m/z calculated for C$_{40}$H$_{49}$O$_4$P$_2$Pt$^+$ (M+H)$^+$850.27483, found 850.27423. $^1$H NMR (600 MHz, Chloroform-d) δ 7.74-7.67 (m, 8H), 7.40 (m, 12H), 2.51 (t, J=12.2 Hz, 2H), 2.11 (d, J=12.4 Hz, 4H), 1.69 (s, 4H), 1.60 (d, J=12.9 Hz, 2H), 1.39 (s, 6H), 1.28 (q, J=13.1 Hz, 4H), 0.96 (m, 6H). $^{13}$C NMR (151 MHz, Chloroform-d) δ 176.9, 134.1 (t, J=5.7 Hz), 129.9, 127.8 (t, J=4.8 Hz), 34.1, 28.4, 27.2, 26.1, 22.0. $^{31}$P NMR (243 MHz, Chloroform-d) δ 21.0 (s+d, J=2940.3 Hz). $^{195}$Pt NMR (129 MHz, Chloroform-d) δ-2844.1 (t, J=2967.0 Hz).

t-[Pt(acetato)$_2$(C$_{17}$H$_{14}$NP)$_2$] (2e). Yield: 28% (39 mg, 0.047 mmol). HRMS (ESI) m/z calculated for C$_{38}$H$_{35}$O$_4$N$_2$P$_2$Pt$^+$ (M+H)$^+$840.17143, found 840.17102. $^1$H NMR (600 MHz, Chloroform-d) δ 8.74-8.71 (m, 2H), 8.51 (d, J=4.5 Hz, 2H), 7.87 (q, J=5.7 Hz, 8H), 7.78 (t, J=8.7 Hz, 2H), 7.42 (t, J=7.2 Hz, 4H), 7.38 (t, J=7.2 Hz, 8H), 7.30 (d, J=7.5 Hz, 2H), 0.89 (s, 6H). $^{13}$C NMR (151 MHz, Chloroform-d) δ 176.4, 149.9 (t, J=7.2 Hz), 135.8 (t, J=5.1 Hz), 135.0 (t, J=6.3 Hz), 132.9 (t, J=14.7 Hz), 130.5, 128.7 (t, J=28.3 Hz), 128.0 (t, J=5.4 Hz), 124.2, 20.9. $^{31}$P NMR (162 MHz, Chloroform-d) δ 15.6 (s+d, J=3094.2 Hz). $^{195}$Pt NMR (129 MHz, Chloroform-d) δ-2925.8 (t, J=3121.8 Hz).

3.3 Synthesis of {Pt[Ph$_2$P(CH$_2$)$_2$PPh$_2$]2}Cl$_2$ and {Pt[Ph$_2$P(CH$_2$)$_3$PPh$_2$]2}Cl$_2$ Scheme 3. Synthesis route of {Pt[Ph$_2$P(CH$_2$)$_2$PPh$_2$]$_2$}Cl$_2$ (A) and {Pt[Ph$_2$P(CH$_2$)$_3$PPh$_2$]$_2$}Cl$_2$ (B)

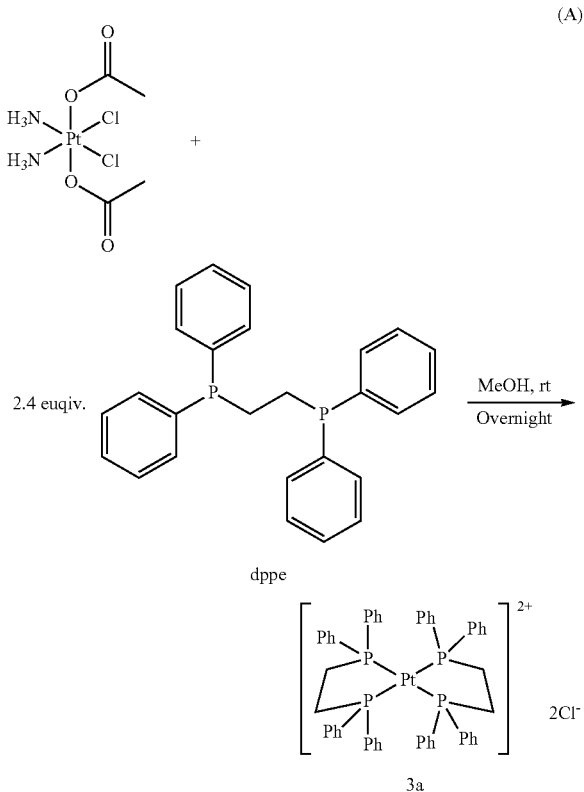

-continued

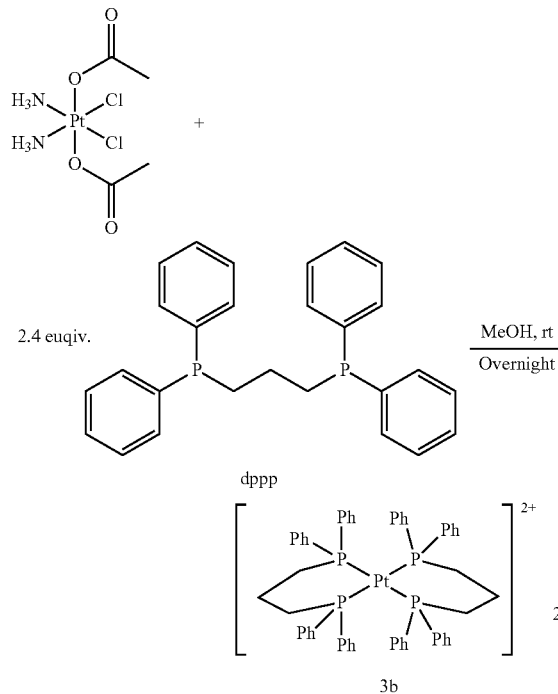

3b c,c,t-[Pt(NH$_3$)$_2$Cl$_2$(acetato)$_2$] (71 mg, 0.17 mmol) was suspended in methanol (3 mL), to which 2.4 equiv. of phosphines [0.41 mmol, 1,2-bis(diphenylphosphino)ethane (dppe, 162 mg) or 1,3-bis(diphenylphosphino)propane (dppp, 168 mg)] were added. The mixture was stirred overnight at room temperature. The desire product was formed as white precipitate and collected by centrifugation. After washing with diethyl ether (30 mL) for twice, the final product was collected as white solid.

[Pt(C$_{26}$H$_{24}$P$_2$)$_2$]Cl$_2$ (3a) Yield: 34%. (60 mg, 0.057 mmol) HRMS (ESI) m/z calculated for C$_{52}$H$_{48}$ClP$_4$Pt$^+$ (M-Cl)$^+$1027.20491, found 1027.20496; m/z calculated for C$_{52}$H$_{48}$P$_4$Pt$^{2+}$ (M-2C1)$^2$+495.61793, found 495.61902. $^1$H NMR (600 MHz, Chloroform-d) δ 7.73-7.67 (m, 16H), 7.33 (t, J=7.3 Hz, 16H), 7.30 (d, J=7.2 Hz, 8H), 3.36 (t, J=7.9 Hz, 8H). $^{13}$C NMR (151 MHz, Chloroform-d) δ 134.8, 132.0, 129.1, 126.1, 31.9. $^{31}$P NMR (243 MHz, Chloroform-d) δ 47.2 (s+d, J=2357.1 Hz).

[Pt(C$_{54}$H$_{52}$P$_2$)]Cl$_2$(3b). Yield: 73%. (133 mg, 0.122 mmol)$^1$H NMR (600 MHz, D$_2$O) δ 7.40 (t, J=6.5 Hz, 8H), 7.28 (d, J=6.5 Hz, 32H), 2.61 (t, J=6.5 Hz, 8H), 2.03-1.91 (m, 4H). $^{13}$C NMR (151 MHz, D$_2$O) δ 133.27, 132.52, 129.38, 126.01-125.41 (m), 23.98-23.46 (m), 16.96. $^{31}$P NMR (243 MHz, D$_2$O) 6-7.0 (s+d, J=2189.2 Hz).

4. Cytotoxicity Test 4.1 Cell Lines and Cell Culture Conditions

Human ovarian A2780 and cisplatin-resistant A2780cisR cells were maintained in Roswell Park Memory Institution (RPMI) 1640 medium supported with 10% FBS, 2 mM L-glutamine, and 100 unit/mL penicillin/streptomycin. Human lung carcinoma A549 cells, cisplatin-resistant A549cisR cells, and human breast MCF-7 cells were cultured in Dulbecco's Modified Eagle Medium (DMEM) with 10% FBS and 100 units penicillin/streptomycin.

4.2 Cytotoxicity Test

The viability of cancer cells exposed to the compounds was evaluated by means of MTT assay. Cells were seeded in 96-well plates at a density of 3,000 cells per well and incubated until the cell confluency reached 50%. Then, the medium was removed and replaced with fresh medium containing different concentrations of complexes with 1% DMF. For complex 3a and 3b with A2780, A2780CisR, A549 and A549CisR cells, the medium used for replacement contains no DMF. After 72 h, the medium was changed to serum-free medium containing 1 mg/mL MTT. After 2 h additional incubation, the medium was removed, and DMSO (200 μL) was delivered to each well to dissolve the formed purple formazan. The absorbance at 570 nm and 730 nm of each well was measured using a microplate reader (BioTek PowerWave XS).

4.3 Cytotoxicity result

TABLE 1

Cytotoxicity of complexes 1a to 1e, 2a to 2e, 3a, 3b and cisplatin.

| Complexes | 72 h IC$_{50}$ (μM) | | | | |
|---|---|---|---|---|---|
| | A2780 | A2780cisR | A549 | A549cisR | MCF-7 |
| 1a | 4.3 ± 0.6 | 3.3 ± 0.8 | 3.3 ± 0.6 | 5 ± 1 | 10 ± 1 |
| 1b | 15 ± 1 | 13 ± 1 | 5.3 ± 0.6 | 8 ± 5 | — |
| 1c | 18 ± 3 | 10 ± 2 | 7 ± 1 | 7 ± 2 | — |
| 1d | 4.9 ± 0.6 | 3.1 ± 0.2 | 5 ± 3 | 5 ± 1 | — |
| 1e | 8 ± 4 | 7.2 ± 0.2 | 5.0 ± 0.8 | 5 ± 2 | — |
| 2a | 8 ± 1 | 7 ± 2 | 28 ± 3 | — | 7 ± 1 |
| 2b | 4 ± 1 | 4 ± 1 | 6.1 ± 0.3 | — | 4 ± 0.3 |
| 2c | 4 ± 1 | 4 ± 1 | 24 ± 7 | — | 18 ± 2 |
| 2d | >2.4 | >2.4 | >2.7 | — | >2.4 |
| 2e | >9.4 | >9.4 | >11.1 | — | >9.4 |
| 3a | 12 ± 3 | 5 ± 1 | 3.6 ± 0.2 | 1.3 ± 0.1 | 7 ± 1 |
| 3b | 0.23 ± 0.09 | 2.6 ± 0.6 | 0.48 ± 0.02 | 0.07 ± 0.01 | 0.2 ± 0.01 |
| cisplatin | 2.1 ± 0.6 | 23 ± 6 | 2.0 ± 0.1 | 12 ± 1 | 18 ± 3 |

The invention claimed is:
1. A platinum complex having the structure of Structure III:

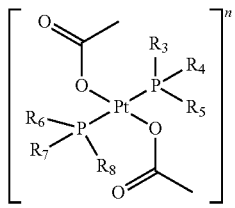

Structure III wherein,
n is an electrical charge of the complex and is 0, a positive integer or a negative integer;
$R_3$, $R_4$, $R_6$ and $R_7$ are independently phenyl, and $R_5$ and $R_8$ are independently

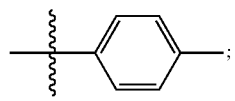

or
$R_3$, $R_4$, $R_5$, $R_6$, $R_7$ and $R_8$ are independently

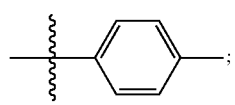

or
$R_3$, $R_4$, $R_5$, $R_6$, $R_7$ and $R_8$ are independently

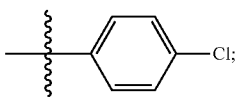

or
$R_3$, $R_4$, $R_6$ and $R_7$ are independently phenyl, and $R_5$ and $R_8$ are independently

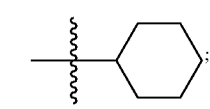 [SMILES: *C1CCCCC1 ; ";"]

or
$R_3$, $R_4$, $R_6$ and $R_7$ are independently phenyl, and $R_5$ and $R_8$ are independently

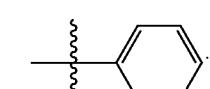

2. The platinum complex as claimed in claim 1, wherein $R_3$, $R_4$, $R_6$ and $R_7$ are independently phenyl, and $R_5$ and $R_8$ are Independently

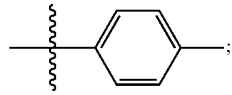

or
$R_3$, $R_4$, $R_5$, $R_6$, $R_7$ and $R_8$ are independently

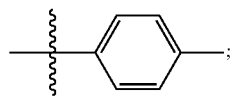 [SMILES: *c1ccc(C)cc1 ; ";"]

or
$R_3$, $R_4$, $R_5$, $R_6$, $R_7$ and $R_8$ are independently

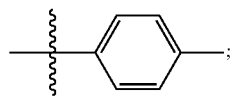 [SMILES: *c1ccc(C)cc1 ; ";"]

or
$R_3$, $R_4$, $R_6$ and $R_7$ are independently phenyl, and $R_5$ and $R_8$ are independently or
$R_3$, $R_4$, $R_6$ and $R_7$ are independently phenyl, and $R_5$ and $R_8$ are independently 3. A platinum complex having the structure of Structure IV:

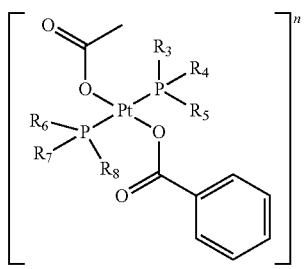

Structure IV wherein, n is an electrical charge of the complex and is 0, a positive integer or a negative integer and $PR_6R_7R_8$ and $PR_3R_4R_5$ are represented by phosphine ligands selected from the group consisting of
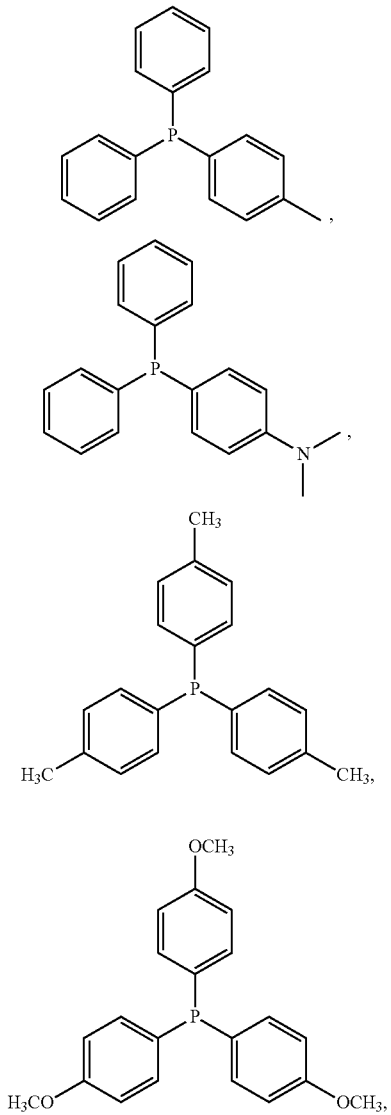
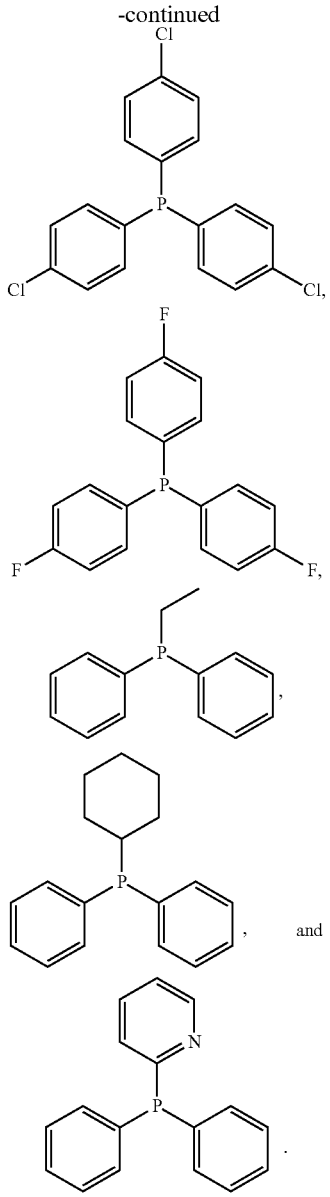
* * * * *